United States Patent
Clermonts

(10) Patent No.: US 7,336,045 B2
(45) Date of Patent: Feb. 26, 2008

(54) SPEED REGULATOR FOR A BRUSHLESS DC MOTOR

(75) Inventor: Franciscus Maria Henricus Clermonts, Eindhoven (NL)

(73) Assignee: Innosource B.V., Sassenheim (NL)

( * ) Notice: Subject to any disclaimer, the term of this patent is extended or adjusted under 35 U.S.C. 154(b) by 0 days.

(21) Appl. No.: 10/557,711

(22) PCT Filed: May 26, 2004

(86) PCT No.: PCT/NL2004/000375

§ 371 (c)(1),
(2), (4) Date: Jul. 6, 2006

(87) PCT Pub. No.: WO2004/105228

PCT Pub. Date: Dec. 2, 2004

(65) Prior Publication Data
US 2007/0029958 A1 Feb. 8, 2007

(30) Foreign Application Priority Data
May 26, 2003 (NL) .................................. 1023532

(51) Int. Cl.
*H02P 7/00* (2006.01)

(52) U.S. Cl. ...................... 318/254; 318/138; 318/439; 318/721

(58) Field of Classification Search .................... None
See application file for complete search history.

(56) References Cited

U.S. PATENT DOCUMENTS

| | | |
|---|---|---|
| 5,363,028 A | 11/1994 | Mori |
| 5,780,986 A | 7/1998 | Shelton et al. |
| 6,388,409 B1 | 5/2002 | Weigold et al. |
| 6,408,130 B1 | 6/2002 | Elferich |
| 6,859,001 B2 * | 2/2005 | Kane et al. .................. 318/254 |
| 7,157,878 B2 * | 1/2007 | Collier-Hallman .......... 318/567 |
| 7,265,509 B2 * | 9/2007 | Endo et al. .................. 318/432 |

(Continued)

OTHER PUBLICATIONS

European Conference on Power Electronics and Applications, London, IEEE, GB, vol. 4, Conf. 5, Sep. 13, 1993, pp. 266-271, XP000427085; Cros J, et al.

*Primary Examiner*—Lincoln Donovan
*Assistant Examiner*—Eduardo Colon
(74) *Attorney, Agent, or Firm*—Sughrue Mion, Pllc.

(57) ABSTRACT

Speed regulator for a brushless DC motor, wherein the DC motor comprises a stator, a rotor and an electromagnet wherein the electromagnet is in the vicinity of the stator, the rotor produces a permanent magnetic field and the electromagnet is activated to generate an alternating magnetic field; furthermore comprising a power supply and a regulating element, the regulating element being connected to the power supply to regulate the power feed to the electromagnet, so that, during use, a torque generated by the DC motor is regulated, characterized in that the speed regulator is able to generate a voltage $V(\phi)$ as a function of rotor speed of revolution, rotor position ($\phi$), rotor load and motor activation, wherein the speed regulator sets the change in the voltage $V(\phi)$ of the motor as a function of the rotor position $\phi$ in such a way that the instantaneous torque $T(\phi)$, at least in the vicinity of the reversal in polarity of the driving magnetic field, complies with the conditions that the derivative $\partial T(\phi)/\partial \phi$ is essentially zero and the second derivative $\partial^2 T(\phi)/\partial \phi^2$ is an essentially monotonic function.

10 Claims, 9 Drawing Sheets

U.S. PATENT DOCUMENTS

2004/0239200 A1* 12/2004 Strahan .................. 310/162
2006/0055352 A1* 3/2006 Mori et al. ............... 318/432
2007/0096672 A1* 5/2007 Endo et al. ............... 318/432

* cited by examiner

SPEED REGULATOR FOR A BRUSHLESS DC MOTOR

BACKGROUND OF THE INVENTION

1. Field of the Invention

The present invention relates to a speed regulator for a brushless DC motor according to the precharacterising clause of claim 1.

2. Discussion of Related Art

Such a regulator is known in the state of the art for regulating the voltage supplied to a DC motor. In the DC motor there are a stator, a rotor and an electromagnet, the electromagnet being in the form of a winding around the rotor component or inside the rotor component. The rotor consists of a number of permanent magnet poles located uniform distances apart on a circle, the stator poles generating a permanent magnetic field. The stator is either inside or outside this circle. During use an alternating magnetic field is generated in the electromagnet by the voltage supplied, the rotor executing a rotation under the influence of the alternating magnetic field of electromagnet and stator.

In the state of the art activation of the electromagnet by means of rectangular pulses is employed, the voltage being supplied to the electromagnet in the form of a rectangular pulse. Because of the transient that arises in the drive torque of the motor when a rotor pole passes by a stator pole, a variable-speed brushless DC motor exhibits vibration while the motor is turning. This vibration leads to the production of noise by the DC motor. However, such noise production is undesirable for many applications where speeds of revolution of less than approximately 200 rpm are usually used.

It is known to provide a voltage regulator in the DC motor such that the transient of the drive torque is minimised at a (pre-)determined speed of revolution. For this purpose the speed regulator is provided with a Hall sensor that is positioned some distance away along the path of the rotor next to one of the stator poles. The regulator is so set that, for said set distance and for a predetermined speed of revolution, the signal that the Hall sensor generates as a result of the rotor field through the Hall sensor ensures that the reversal of polarity of the magnetic field proceeds in such a way that the transient of the torque of the motor while the rotor is passing by the stator is minimal.

A disadvantage of this regulator according to the state of the art is that vibration is substantially suppressed only at mainly one speed of revolution. At other speeds of revolution this regulator does not function well; the torque transient is not then minimal.

As an alternative to achieve a sufficiently usable suppression of vibration at several speeds of revolution, a voltage regulator is known that employs rectangular pulses of variable height, the height of the rectangular pulse depending on the desired speed of revolution of the motor. In order to reduce the vibration at a set speed of revolution, the pulse height of the rectangular pulse is lowered, so that the field strength is lower and the transient smaller. Vibration does indeed decrease by this means, but does not reach the values that are theoretically possible.

One aim of the present invention is to provide a speed regulator for a brushless DC motor that is capable of substantially reducing the transient in the motor torque at any arbitrary speed of revolution.

SUMMARY OF THE INVENTION

The aim of the present invention is achieved by a speed regulator for a brushless DC motor according to the pre-characterising clause of claim 1, characterised in that the speed regulator is able to generate a voltage $(V(\phi))$ as a function of rotor speed of revolution, rotor position $(\phi)$, rotor load and motor activation, wherein the speed regulator sets the change in the voltage $V(\phi)$ of the motor as a function of the rotor position $\phi$ in such a way that the instantaneous torque $T(\phi)$, at least in the vicinity of the reversal in polarity of the driving magnetic field, complies with the conditions that the derivative $\partial T(\phi))/\partial \phi$ is essentially zero and the second derivative $\partial^2 T(\phi))/\partial \phi^2$ is an essentially monotonic function.

As a result the speed regulator according to the present invention has the advantage that the regulation at any desired combination of speed of revolution, motor load and activation power is able to minimise the vibration in the motor. As a result a DC motor that is provided with such a regulator can be used for environments where as low as possible a noise level at relatively low frequencies is desired. For example in homes and work areas where slowly running (i.e. energy-saving) DC motors are used for ventilation systems. In these cases a speed of revolution of between 5 and 30 rps is employed.

It will be clear to a person skilled in the art that the present invention can be employed in a single-phase DC motor but also in a multi-phase DC motor.

The invention will be explained in more detail below with reference to a few drawings in which illustrative embodiments thereof are shown. They are intended exclusively for illustrative purposes and not to restrict the inventive concept, which is defined by the claims. In the drawings:

BRIEG DESCRIPTON OF THE DRAWINGS

DETAILED DESCRIPTION OF THE DRAWINGS

Figure 1:
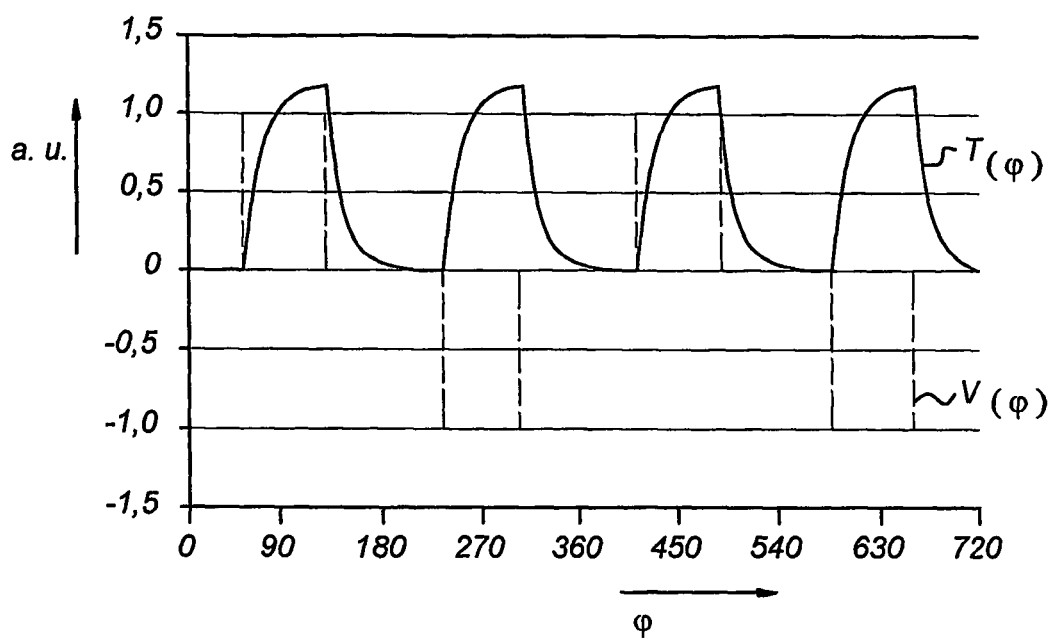
FIG. 1 shows, diagrammatically, a drive voltage plot and a torque plot for a first speed regulator according to the state of the art.

FIG. 1 shows, diagrammatically, a drive voltage plot and torque plot for a first speed regulator according to the state of the art.

The angle of rotation φ of the rotor relative to the stator is shown on the horizontal axis. The drive voltage V(φ) and the associated torque T(φ) are shown in arbitrary units (a.u.) on the vertical axis. The drive voltage V(φ) as a function of the angle of rotation φ is shown by means of a broken line. The torque plot T(φ) as a function of the angle of rotation is shown by a continuous line.

The first speed regulator according to the state of the art makes use of a conventional controller that generates rectangular voltage pulses as a function of the angle of rotation φ. The voltage pulses are generated synchronously with the passage of the rotor poles past the stator poles. The torque increases during the starting flank of a rectangular pulse. The torque decreases again at the end flank of a pulse. Between rectangular pulses the drive voltage V(φ) is essentially zero; during this zero voltage the torque T(φ) approaches a zero value. The abrupt transition (transient) that arises in the torque plot during the start of a voltage pulse results in production of noise. Especially at a low speed of revolution, the noise production can be annoying since the voltage pulses then have a relatively short duration, which results in an increasing noise production.

Figure 2:
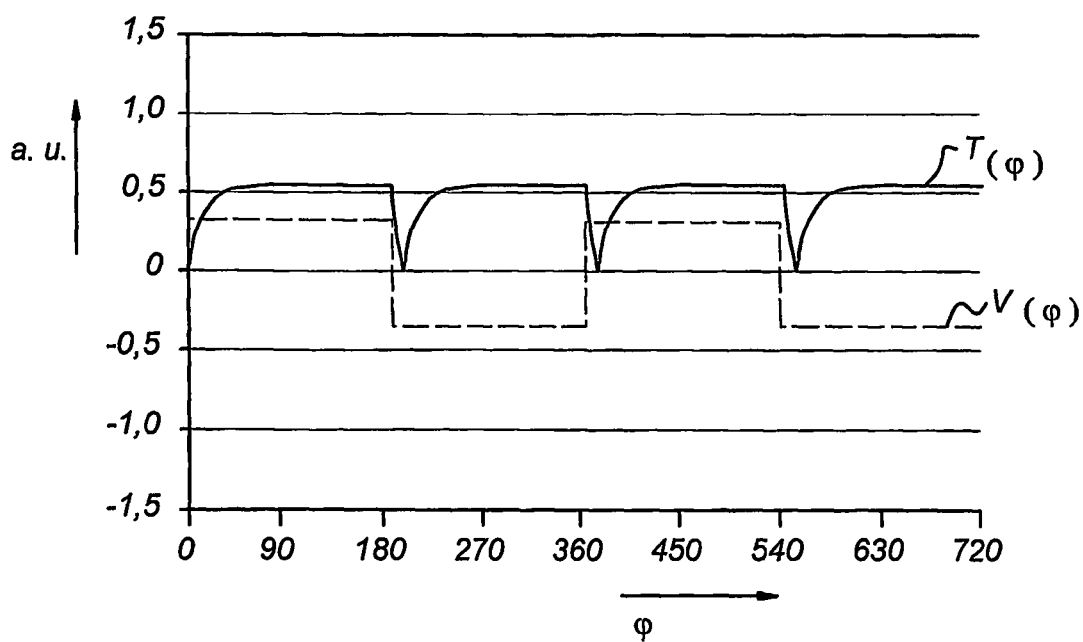
FIG. 2 shows, diagrammatically, a drive voltage plot and a torque plot for a second speed regulator according to the state of the art.

FIG. 2 shows, diagrammatically, a drive voltage plot and torque plot for a second speed regulator according to the state of the art.

The angle of rotation φ of the rotor relative to the stator is shown on the horizontal axis. The drive voltage V(φ) and the associated torque T(φ) are shown in arbitrary units on the vertical axis. The drive voltage V(φ) as a function of the angle of rotation φ is shown by means of a broken line. The torque plot T(φ) as a function of the angle of rotation is shown by a continuous line.

The transient behaviour of drive torque T(φ) at low speeds of revolution can be improved by reducing the drive voltage V(φ). The rectangular pulse height is reduced and the rectangular pulse width is increased. This leads to a somewhat flatter characteristic of the drive torque as a function of the angle of rotation φ. The result of the adaptation of height and width of rectangular pulses is shown in FIG. 2. Although the torque plot is smoother, there are still transients. The strength of vibration and noise production does indeed decrease by this means, but the power delivered by the DC motor likewise decreases substantially and disadvantageously as a result.

Figure 3:
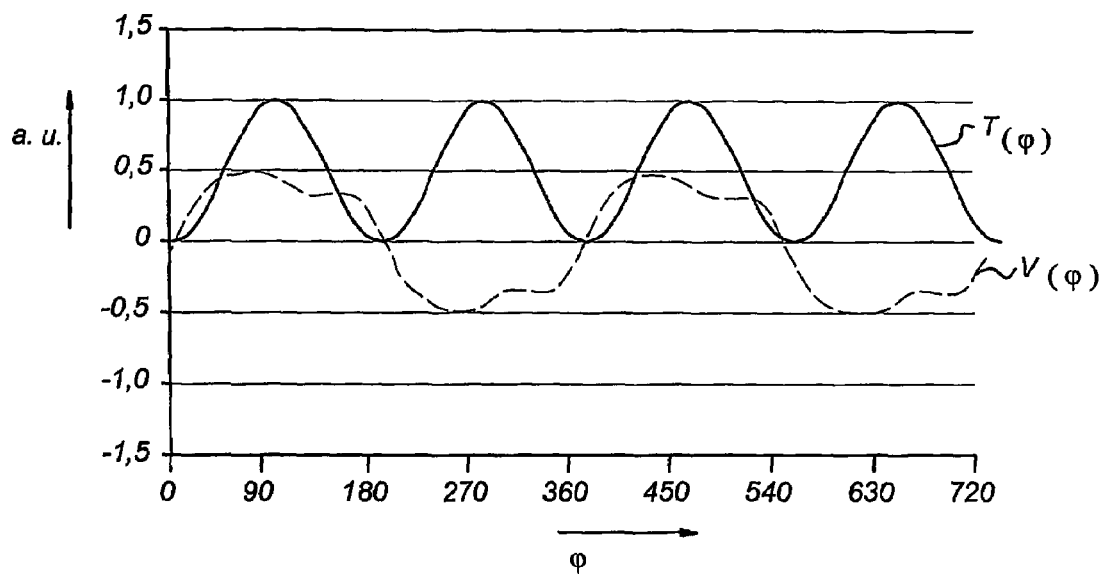
FIG. 3 shows, diagrammatically, a drive voltage plot and a torque plot for a speed regulator according to the present invention.

FIG. 3 shows, diagrammatically, a drive voltage plot and torque plot for a speed regulator according to the present invention.

The angle of rotation φ of the rotor relative to the stator is shown on the horizontal axis. The drive voltage V(φ) and the associated torque T(φ) are shown in arbitrary units on the vertical axis. The drive voltage V(φ) as a function of the angle of rotation φ is shown by means of a broken line. The torque plot T(φ) as a function of the angle of rotation is shown by a continuous line.

The present invention provides a speed regulator that suppresses torque transients by actively regulating the drive voltage V(φ) as a function of the angle of rotation φ via feedback of characteristics of the state of the DC motor. Because of the construction, in a brushless DC motor the drive torque passes through zero during each rotation through 180°. Furthermore, the torque T(φ) during a rotation through 360° is on average always greater than zero. In order to reduce the transients, the derivative of the torque as a function of the angle of rotation φ during the reversal of polarity has to be essentially zero. Furthermore, no abrupt changes in the torque around the change in polarity are desired: the second derivative of the torque as a function of the angle of rotation (p is a function that rises monotonically around the passage through zero.

An illustrative torque plot without transients that meets these conditions is given by:

$$T(\varphi) = \hat{T} \cdot \left(\frac{1}{2} - \frac{1}{2}\cos(4\varphi)\right)$$

where T(φ) is the instantaneous torque and $\hat{T}$ is an average value of the torque.

It will be clear to a person skilled in the art that other torque plots are also possible that meet the conditions for the torque derivative for a periodic passage through zero and a positive definite value of the torque.

Note that for a brushless DC motor with n pole pairs of the stator the illustrative torque plot is given by:

$$T(\varphi) = \hat{T} \cdot \left(\frac{1}{2} - \frac{1}{2}\cos(2n\varphi)\right)$$

The speed regulator according to the present invention provides an instantaneous drive voltage V(φ) such that the instantaneous torque T(φ) meets the set conditions as well as possible.

Figure 4:
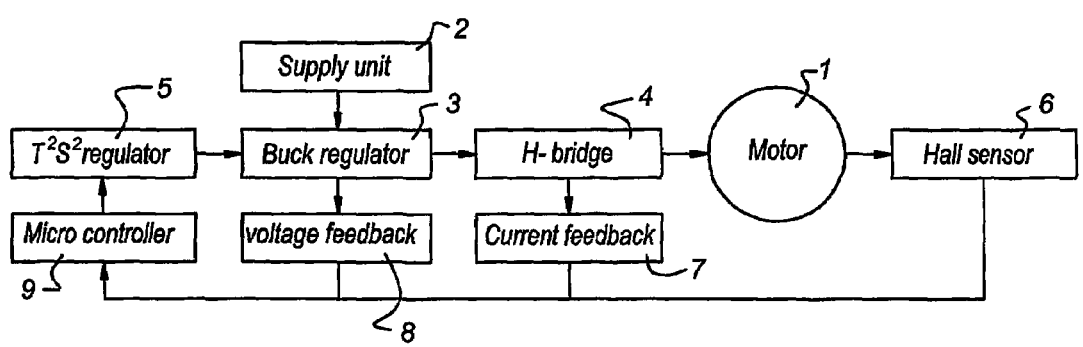
FIG. 4 shows a diagrammatic model of the speed regulator according to the present invention.

In FIG. 4 the drive voltage V(φ) is a function of φ such that T(φ) satisfies the equation shown. In this case the instantaneous values of both the rotor speed of revolution, the rotor load, the rotor position and the drive voltage itself are taken into consideration. The speed regulator provides an active suppression of the higher harmonics in the torque plot. Reference is made to FIGS. 4 to 9 for a description of the speed regulator according to the present invention.

FIG. 4 shows a diagrammatic model of the speed regulator according to the present invention.

A brushless DC motor 1 is provided with a speed regulator according to the present invention. The speed regulator comprises a power supply 2, a Buck regulator 3, an H-bridge 4, a drive regulator 5, a Hall sensor 6, a current feedback unit 7, voltage feedback unit 8 and a regulating element 9.

In the description and figures given below the present invention is described with reference to a microcontroller 9 as regulating element. It will be clear to those skilled in the art that another regulating element, such as an analogue circuit equipped for this purpose or, for example, a digital signal processor (DSP) can also be used instead of the microcontroller, the regulating element being able to perform the control functions required in the present invention.

A drive input of the motor 1 is coupled to H-bridge 4, which supplies the drive voltage V(φ). Motor 1 is also provided with the Hall sensor 6 for determining the position and movement of the rotor (not shown), the Hall sensor 6 generating an instantaneous signal $S_{HS}(t)$.

The H-bridge 4 is coupled to the Buck regulator 3 to obtain drive pulses for generating the drive voltage V(φ) in the H-bridge 4.

Furthermore, the H-bridge 4 is coupled to a current feedback unit 7 that generates a current signal $I_{in}(t)$ that corresponds to the instantaneous current supplied to the motor 1 by the H-bridge 4.

The Buck regulator 3 is coupled to the power supply 2 to supply electrical power to the circuit. Furthermore, the Buck regulator 3 is coupled to the drive regulator 5 for receiving control signals for generating the drive pulses for the drive voltage $V(\phi)$. The Buck regulator 3 is also coupled to the voltage feedback unit 8 that generates a voltage signal $V_{in}(t)$ that is used to control the Buck regulator.

The drive regulator 5 is furthermore coupled to the microcontroller 9 for receiving data by means of which the drive regulator 5 is able to generate the correct drive pulses for the Buck regulator 3.

Finally, microcontroller 9 is connected to Hall sensor 6, current feedback unit 7 and voltage feedback unit 8 so as to obtain, from the respective signals generated by these, information with regard to the instantaneous values of the rotor speed of revolution, the rotor load, the rotor position as well as the drive voltage and drive current The Buck regulator 3 controls the actual drive voltage for the DC motor 1, the H-bridge 4 switches the polarity of the drive voltage supplied to the motor 1 after each 180° revolution. The microcontroller 9 controls the required speed of rotation of the DC motor 1, whilst the drive regulator 5 generates the drive pulse for the correct drive voltage $V(\phi)$, based on the data on rotor speed of revolution, rotor load, rotor position $\phi$, drive voltage and drive current collected by the microcontroller 9.

The drive regulator 5 establishes the drive pulses on the basis of the data on rotor speed of revolution, rotor load, rotor position, drive voltage and drive current collected by the microcontroller 9.

It can be that the drive regulator 5 calculates the requisite drive pulses from the data in real time. It can also be that drive regulator 5 makes use of a multidimensional table in order to determine therefrom the drive pulse associated with the instantaneous values of the data.

The drive voltage $V(\phi)$ is built up as the envelope of the drive pulses generated by the drive regulator 5. The frequency of the drive pulses (for example 22 kHz) is higher than the frequency of rotation of the rotor, namely approximately 50-200 Hz. Furthermore, the drive regulator 5 can vary the height of the drive pulses so that, for example, a change in the drive voltage $V(\phi)$ as shown in FIG. 3 can be generated.

Figure 5:
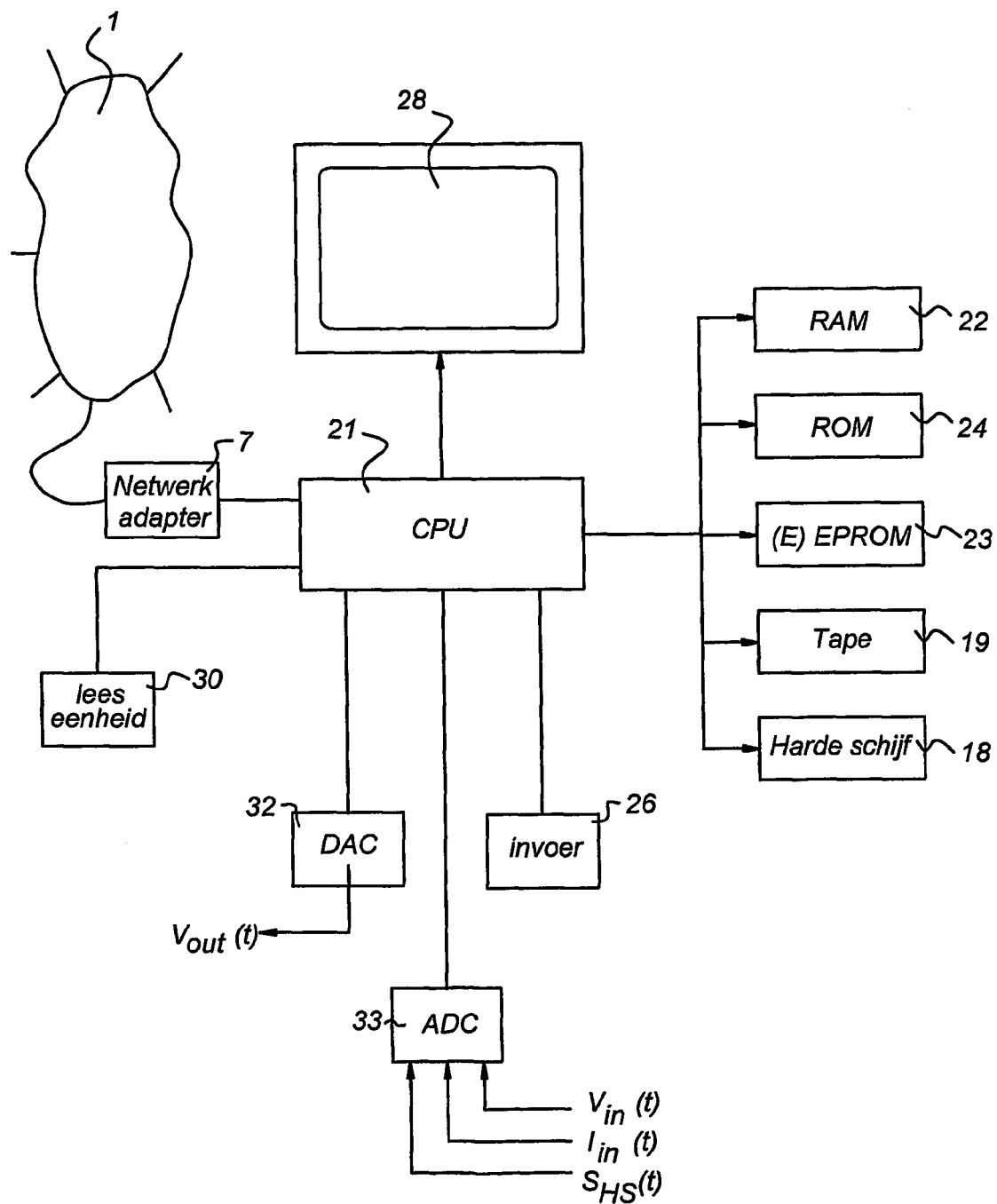
FIG. 5 shows a computer system for controlling the speed regulator of a brushless DC motor according to the present invention.

FIG. 5 shows a microcontroller/computer system for controlling a speed regulator of a brushless DC motor according to the present invention. A computer system 2 comprises a central processing unit 21 with peripheral equipment. The central processing unit 21 is connected to memory means 18, 19, 22, 23, 24 that store instructions and data, one or more readers 30 (for reading, for example, floppy disks, CD-ROMs and DVDs, memory modules, chip cards, etc.), input equipment (for example a keyboard) 26 and output equipment (for example a monitor) 28.

In addition, a controllable voltage generator (for example in the form of a digital/analogue converter DAC) 32, is provided as output equipment for generating a variable voltage $V_{out}(t)$.

A voltage and/or current measurement unit ADC 33 is also provided as input equipment to convert voltage signals $V_{in}(t)$, current signals $I_{in}(t)$ and Hall sensor signals $H_{HS}(t)$ fed to the ADC unit 33 into digital measurement values. These digital measurement values for voltage, current and Hall sensor signal, respectively, can be further processed by the processing unit 21 as feedback for the drive regulator 5.

As is known to those skilled in the art, other input units and output equipment can also be provided, such as, for example, a network adapter 7 for data communication with a network 1.

The memory means shown in FIG. 5 comprise RAM 22, (E)EPROM 23, ROM 24, tape unit 19 and hard disk 18. However, more and/or other memory units known per se to those skilled in the art can be provided. Furthermore, if needed, one or more units amongst these can be located remotely from the central processing unit 21.

The central processing unit 21 is shown as a single unit, but can also comprise various processing units that work in parallel, or are controlled by one central unit, it being possible for the processing units to be located remotely from one another, as will be known to those skilled in the art.

A preferred embodiment for a circuit for a speed regulator according to the present invention is explained in more detail below. The essential components of this preferred embodiment will be described. With regard to the other components, only the function thereof will be explained briefly, a person skilled in the art being able to understand the mode of operation of said other components in the regulator from the circuit and the explanation. Furthermore, it is pointed out that the component codes shown merely indicate examples as components in the circuit; in this context the values shown for the electrical components in the circuit are merely illustrative values. The circuit shown can also be implemented with other values for the components.

Figure 6:
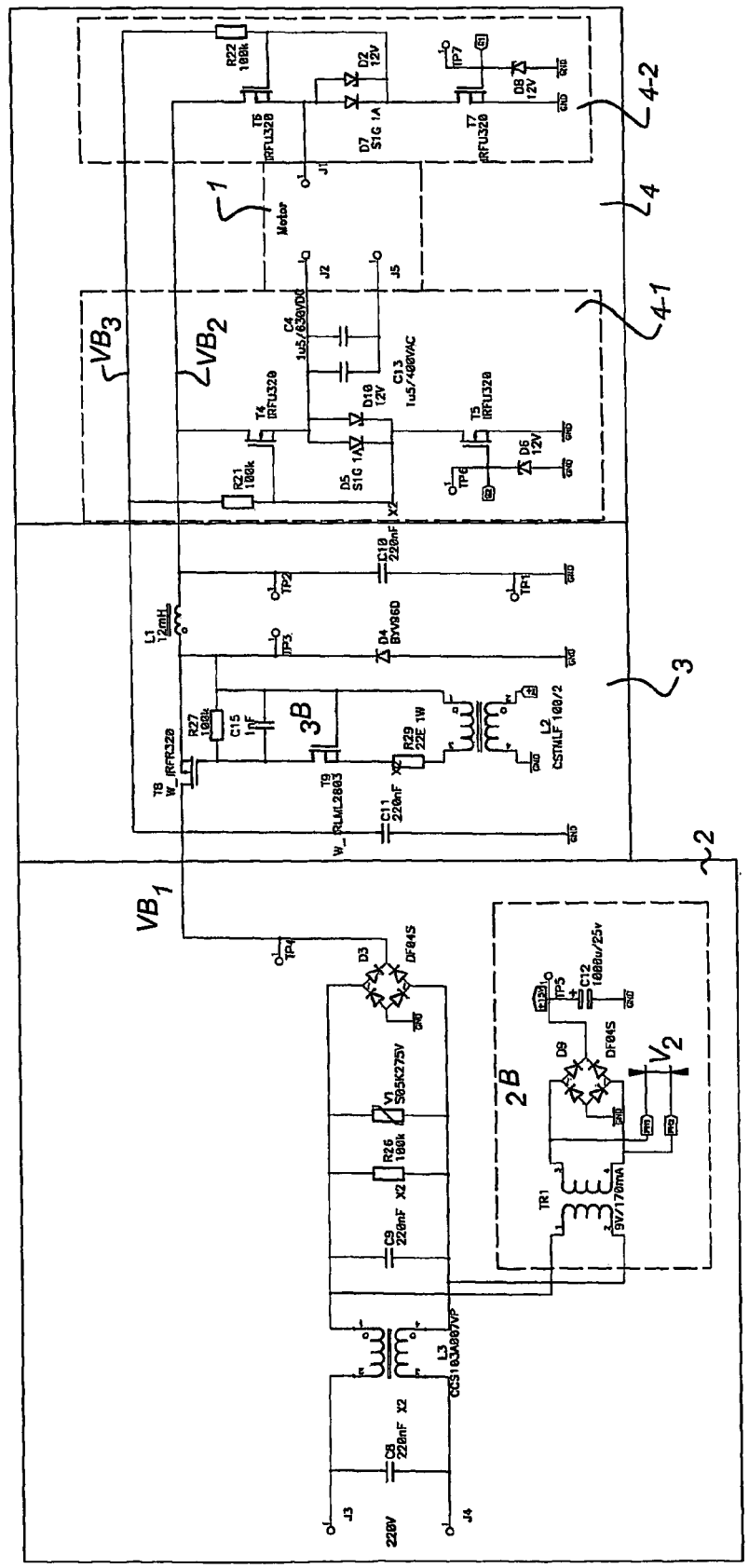
FIG. 6 shows a first part of a first preferred embodiment of a speed regulator according to the present invention.

FIG. 6 shows a first part of a first preferred embodiment of a circuit for a speed regulator according to the present invention.

The first part of the circuit comprises the power supply 2, the Buck regulator 3 and the H-bridge 4.

The power supply 2 serves to convert mains voltage into a rectified supply voltage. Alternating voltage (for example 230 V) is input at junctions J3 and J4, after which the power supply 2, after rectification, makes a rectified voltage (for example 300 V) available on line VB1.

Inside the power supply there is a branch unit 2*b*, which generates a further potential difference V2 across terminals PH1, PH2.

The Buck regulator 3 is made up of transistor T8, coil L1, diode D4 and capacitor C10. Transistor T8 is a MOSFET with a drain connected to VB1 and with a source at an input of L1 and an input of D4. An output of diode D4 is also connected to ground GND. An output of coil L1 is connected to an input of C10, an output of C10 being connected to ground. VB1 is likewise connected to ground via capacitor C11.

The gate of MOSFET T8 is controlled by a pulse transformer circuit 3*b*. Pulse transformer circuit 3*b* comprises a pulse transformer L2, a resistor R29, a MOSFET transistor T9, a capacitor C15 and a second resistor R27.

On its input side, a first input L2-4 of pulse transformer L2 is connected to ground; a second input L2-2 of the pulse transformer L2 is connected to the drive regulator 5 that generates drive pulses for the pulse transformer circuit 3*b*.

The drive regulator 5 will be discussed in more detail with reference to FIG. 7 in this document.

On its output side L2-3, pulse transformer L2 is connected via resistor R29 to a source of MOSFET transistor T9. Via second output L2-1, pulse transformer L2 is connected to a gate of MOSFET T9, and also to an input of capacitor C15 and an input of resistor R27, and also to the line between L1 and D4.

The output of C15 is connected to the source of T8. The output of resistor R27 is likewise connected to the source of T8.

The Buck regulator 3 regulates the drive voltage V(φ) for the motor 1, via H-bridge 4, by means of pulse width modulation (PWM). H-bridge 4 will be described in more detail later.

Because the drain of T8 is directly on the rectified voltage VB1, the pulse transformer circuit 3b is used to drive the gate of T8. With this arrangement it is necessary to be able to vary the duty cycle of T8 within a broad range. If the pulse transformer were to be coupled directly to T8, this is not possible. In order to achieve a wide variation in duty cycle, use is made of a control MOSFET T9, in accordance with the following principle: the pulse transformer L2 is a type with relatively low self-induction, as a result of which the pulse transformer L2 is able to generate narrow pulses (approximately 2 μs wide) as output signal. A positive pulse renders T8 conducting; a subsequent negative pulse puts T8 into the off state. A positive pulse loads the gate of T8 via the intrinsic flywheel diode of T9. Once the gate of T8 has been charged, this is no longer discharged because T9 will turn off when the output voltage of L2 falls to zero. In the case of a negative pulse T9 starts to conduct again and the gate of T8 is discharged, as a result of which T8 reaches the off state. T8 thus functions as a switch for the voltage on VB1 to the H-bridge 4. Resistor R27, which is connected in parallel with T8, ensures that T8 does not start conducting if the control of the pulse transformer circuit 3b is not active. The gate-source capacity of T8 is increased by the lead of C15 in parallel across the source of T8 and the input of L1. On the one hand, C15 lowers the dissipation in T8, by the increase in the gate voltage. On the other hand, the switching time of T8 becomes longer because the discharge of C15 delays switching. The value of C15 has been chosen as a compromise. Resistor R29 serves to restrict the maximum gate current of T8 and to damp resonance in the pulse transformer circuit 3b.

The H-bridge circuit 4 comprises MOSFETs T4, T5, T6, T7, diodes D5, D7, Zener diodes D2, D6, D8, D10 and D12, capacitors C4 and C13 and resistors R21, R22.

Within the H-bridge 4, the brushless DC motor 1 is connected to junctions J1, J2 and J5. The H-bridge 4 is connected to the Buck regulator 3 via line VB2 and line VB3. The H-bridge 4 has two branches, a first branch 4-1 and a second branch 4-2, both of which are connected to ground on one side. The first branch 4-1 comprises MOSFETs T4, T5, diode D5, Zener diodes D6, D10, capacitors C4 and C13 and resistor R21.

The second branch 4-2 comprises MOSFETs T6, T7, diode D5, D7, Zener diodes D2, D8, D12 and resistor R22.

The H-bridge 4 is driven by a phase detector circuit as will be explained later with reference to FIG. 7. The phase detector circuit drives the gates of transistor T5 and transistor T7 via their respective connection G2 and G1.

Because of the symmetrical construction, only branch 4-1 is described. If the voltage at G2 is sufficiently high, for example 12 V, T5 will conduct. Diode D5 will start conducting. Junction J2 is then connected to ground. The gate of T4 has a somewhat lower voltage (approximately 0.6 V) than the source voltage of D5 (i.e. $V_F$ of D5), so that T4 is in the off state.

If the voltage on G2 is essentially zero volt, T5 will be in the off state. The voltage on the gate of transistor T4 will rise and T4 will start conducting. The voltage on the source of T4 rises until the source-drain voltage $V_{DS}$ is virtually 0 volt. Diode D5 now turns off, Zener diode D10 ensuring that the source-gate voltage $V_{GS}$ of T4 is limited to 12 volt.

The supply voltage from the Buck regulator 3 will now be on J2. Because the phase detector circuit varies the voltage on G1 and the voltage on G2 in opposing phases with one another, an alternating voltage is produced across the junctions J1 and J2, the alternating frequency of which corresponds to the frequency of rotation of the motor.

In the first branch 4-1 of H-bridge 4, Zener diode D6 has its input to ground and its output is connected to the gate of transistor T5. The connection point G2 is also at the gate of T5. The drain of transistor T5 is also to ground.

A first lead of resistor 21 is connected to line VB3 and its second lead is connected to the gate of transistor T4 and to the outputs of diode D5 and Zener diode D10. The outputs of D5 and D10 are likewise connected to the source input of transistor T5.

Line VB2 is connected to the drain of transistor T4. The gate of transistor T4 is connected to the input of diode D5 and the input of Zener diode D10. The source of transistor T4 is also connected to capacitor C13 and capacitor C4, which are connected in parallel with one another. The source of transistor T4 is also connected to junction J2 and, via the capacitors C13 and C4 connected in parallel, to junction J5.

In branch 4-2 of H-bridge 4, the drain of transistor T6 is connected to line VB2. A first lead of resistor R22 is connected to line VB3. The second lead of R22 is connected to the gate of transistor T6 and to the drain of transistor T7. The drain of transistor T6 is connected to an input of diode D7 and to the Zener diode D2 connected in parallel with the latter. The outputs of diode D7 and Zener diode D2 are connected to the drain of transistor T7. The gate of transistor T7 is connected to the connection point G1 and to the Zener diode D8, the input of which is to ground. The source of transistor T7 is connected to ground.

Figure 7:
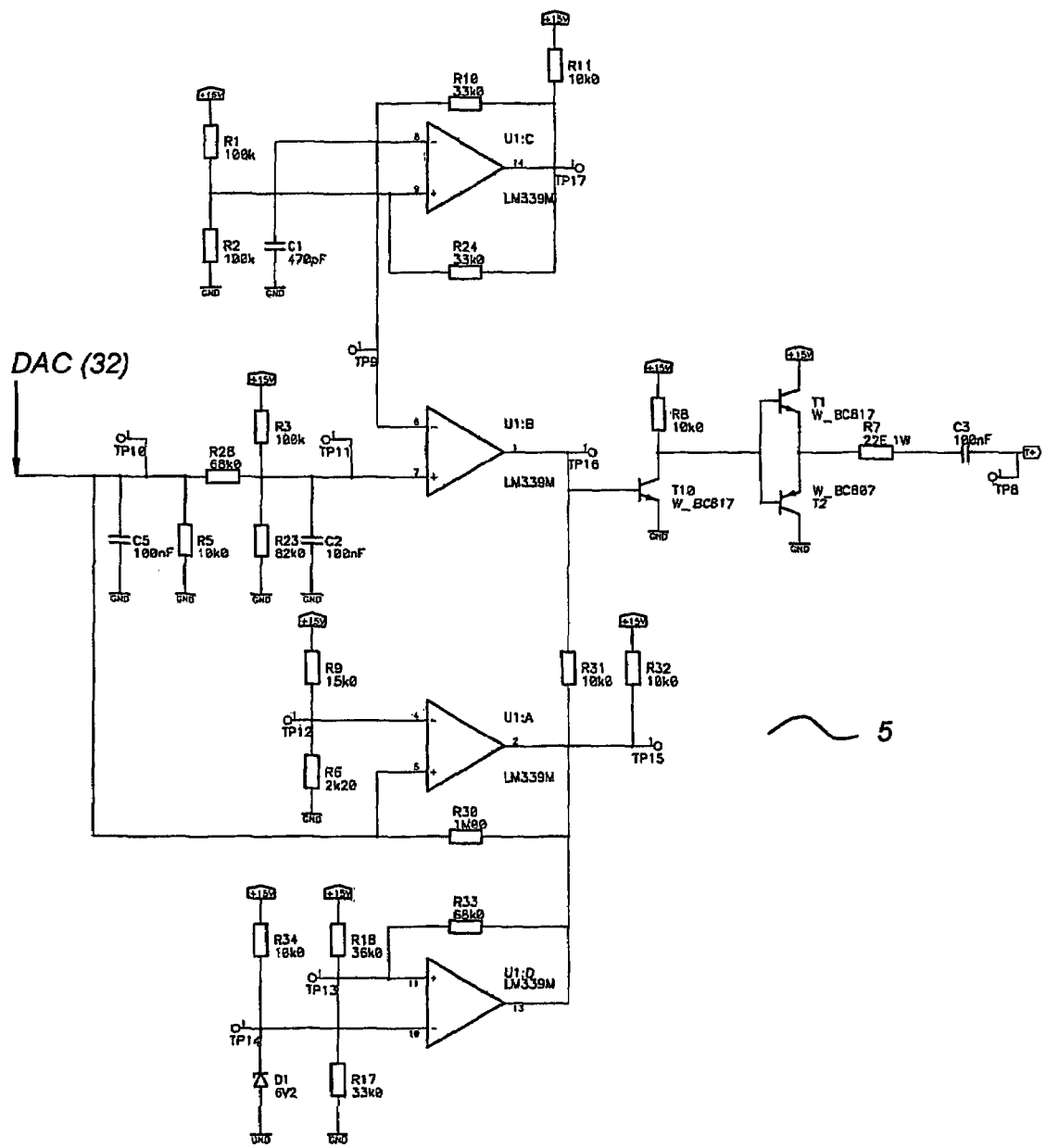
FIG. 7 shows a second part of the first preferred embodiment of a speed regulator according to the present invention.

FIG. 7 shows a second part of the first preferred embodiment of a circuit for a speed regulator according to the present invention. This second part comprises the drive regulator 5. The drive regulator 5 comprises comparators U1:A, U1:B, U1:C and U1:D, transistors T1, T2 and T10, capacitors C1, C2, C3, C5, Zener diode D1 and resistors R1, R2, R3, R5, R6, R7, R8, R9, R10, R11, R17, R18, R23, R24, R28, R30, R31, R32, R33 and R34.

The drive regulator 5 contains a pulse (width modulation) generator to control the Buck regulator 3 by means of drive pulses.

A first lead of resistor R1 is connected to supply voltage, the second lead of R1 being connected to a first lead of resistor R2 and a positive input of comparator U1:C. The second lead of resistor R2 is connected to ground. R1 is also connected to a first lead of resistor R24. A second lead of resistor R24 is connected to the output of comparator U1:C and to a first lead of resistor R11 and a second lead of resistor R10. The second lead of resistor R11 is connected to the supply voltage. The first lead of resistor R10 is connected to the negative input of comparator U1:C as well as to a first lead of capacitor C1, the other lead of which is connected to ground.

The first lead of resistor R10 is also connected to the negative input of comparator U1:B. The positive input of U1:B is connected to a first lead of capacitor C2, a first lead of resistor R23, a first lead of resistor R3 and a first lead of resistor R28. A second lead of R3 is connected to the supply voltage. A second lead of resistor R28 is connected to a first lead of resistor R5 and to a first lead of capacitor C5. The second lead of C2, R23, R5 and C5, respectively, is connected to ground. The second lead of R28 is connected to an output of digital/analogue converter DAC 32.

The output of DAC 32 is also connected to the positive input of comparator U1:A and a first lead of R30. The negative input of U1:A is connected to a first lead of R6 and a first lead of R9. The second lead of R9 is connected to the power supply. The second lead of R6 is connected to ground.

A first lead of resistor R34 is connected to the supply voltage. The second lead of R34 is connected to the negative connection of comparator U1:D and also to the output of Zener diode D1. The input of Zener diode D1 is connected to ground. A first lead of resistor R18 is also connected to the power supply. The second lead of resistor R18 is connected to a first lead of resistor R17 and to a first lead of resistor R33. The second lead of R17 is connected to ground. The second connection R33 is connected to the output of U1:D. The output of U1:D is connected to a first lead of resistor R31. The second lead of R30 is also connected to the first lead of R31. The output of U1:A is also connected to the first lead of R31. Finally, a first connection of a resistor R32 is connected to the first lead of resistor R31. The second lead of R32 is connected to the supply voltage.

The output of comparator U1:B is connected to the second lead of R31. The output of U1:B is also connected to the base of transistor T10. The emitter of transistor T10 is connected to ground.

The collector of T10 is connected to a first lead of resistor R8 and to a base of transistor T2 and a base of transistor T1. The second lead of resistor R8 is connected to supply voltage.

Transistors T1 and T2 are connected to one another in parallel. The collector of T1 is connected to supply voltage. The emitter of T1 is connected to the collector of T2 and to a first lead of resistor R7. The emitter of transistor T2 is connected to ground. The second lead of resistor R7 is connected to a first lead of capacitor C3. The second lead of C3 is connected to the to a terminal T+.

Terminal T+ is connected to the second input L2-2 of the pulse transformer L2; for transmitting the drive pulses that are generated by the circuit in FIG. 7.

To generate the pulse width modulation signal (PWM signal) a delta generator has been constructed by means of the circuit around comparator U1:C. The output signal from this delta generator is not a pure triangle but is formed by an exponential charging and discharging curve of the associated RC network (consisting of R1, R2, C1). The voltage that is generated by DAC 32 determines the speed of revolution of the motor. The voltage is supplied to the positive input of the comparator U1:B by means of a resistor network (consisting of R3, R5, R23 and R28). A PWM signal is worked up at the output side of U1:B by comparing this signal with the signal that is generated from the delta generator constructed around the U1:C.

A facility for cutting the power to the motor is provided in the circuit. This facility is constructed around U1:A. If the signal generated by DAC 32 is below a certain potential, the output of U1:A will make the voltage low, so that the PWM signal will no longer be at the amplifier step at the location of the output of DAC 32.

Figure 8:
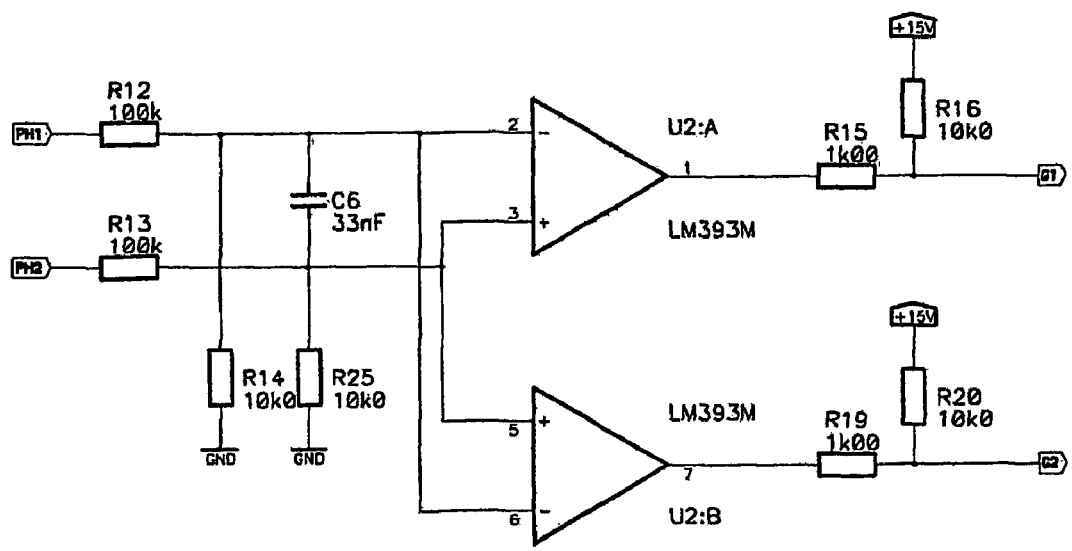
FIG. 8 shows a third part of a first preferred embodiment of a speed regulator according to the present invention.

FIG. 8 shows a third part of a first preferred embodiment of a circuit for a speed regulator according to the present invention. The phase detector circuit previously mentioned in FIG. 6 is in this third part.

The phase detector circuit according to FIG. 8 comprises resistors R12, R13, R14, R15, R16, R19, R20, R25 and comparators U2:A and U2:B and a capacitor C6.

A first lead of R12 is connected to first terminal PH1. Second lead of R12 is connected to the negative input of U2:A, a first lead of R14 and a first lead of C6.

The second terminal PH2 is connected to a first lead of R13. The second lead of R13 is connected to the second lead of C6, to the positive input of U2:A and to the positive input of U2:B. Furthermore, the second lead of R13 is connected to a first lead of R25. The second lead of R14 is connected to ground, as is the second lead of R25.

The negative input of U2:A is likewise connected to the negative input of U2:B. The output of U2:A is connected to a first lead of R15. The second lead of R15 is connected to a first lead of R16 and to connection point G1 of H-bridge 4. The second lead of R16 is connected to the supply voltage.

The output of U2:B is connected to a first lead of R19. The second lead of R19 is connected to a first lead of R20 and to connection point G2 of H-bridge 4. The second lead of R20 is connected to the supply voltage.

The phase detector circuit according to FIG. 8 controls the transistor T7 and T5, respectively, by means of the phase of the signal V2 across the terminals PH1 and PH2, as has already been described with reference to FIG. 6.

Figure 9:
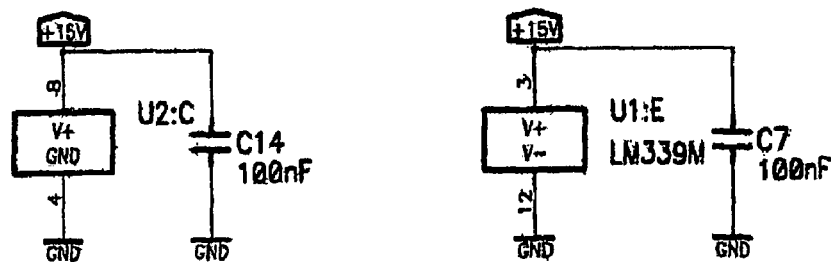
FIG. 9 shows a fourth part of a first preferred embodiment of a speed regulator according to the present invention.

FIG. 9 shows a fourth part of a first preferred embodiment of a circuit for a speed regulator according to the present invention.

The following are contained in this fourth part: comparators U1:E, U2:C, capacitors C7, C14. A first connection of comparator U1:E is connected at a first connection to the supply voltage and to a first lead of capacitor C7. A second connection of U1:E is to ground. A second lead of C7 is likewise to ground.

A first connection of U2:C is connected to the supply voltage and to a first lead of capacitor C14. A second connection of U2:C is connected to ground. A second lead of capacitor C14 is likewise connected to ground.

Figure 10:
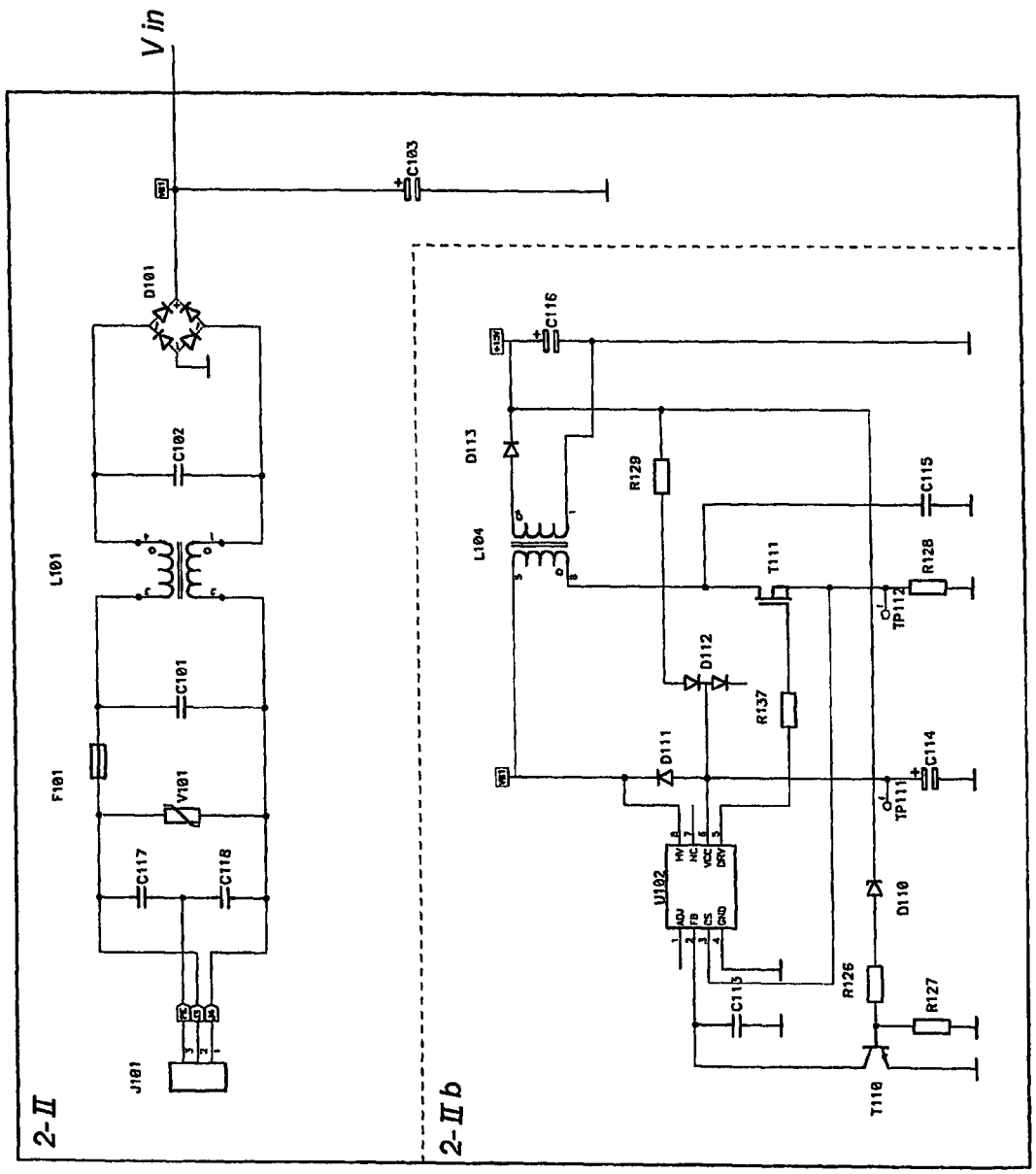
FIG. 10 shows a power supply for a second and third preferred embodiment of a speed regulator according to the present invention.

FIG. 10 shows a power supply for a second and a third preferred embodiment of a speed regulator according to the present invention. The power supply 2-II serves to convert mains voltage into a rectified supply voltage and is equipped to provide this supply voltage Vin to the Buck unit of the second and third preferred embodiment of a speed regulator.

Figure 11:
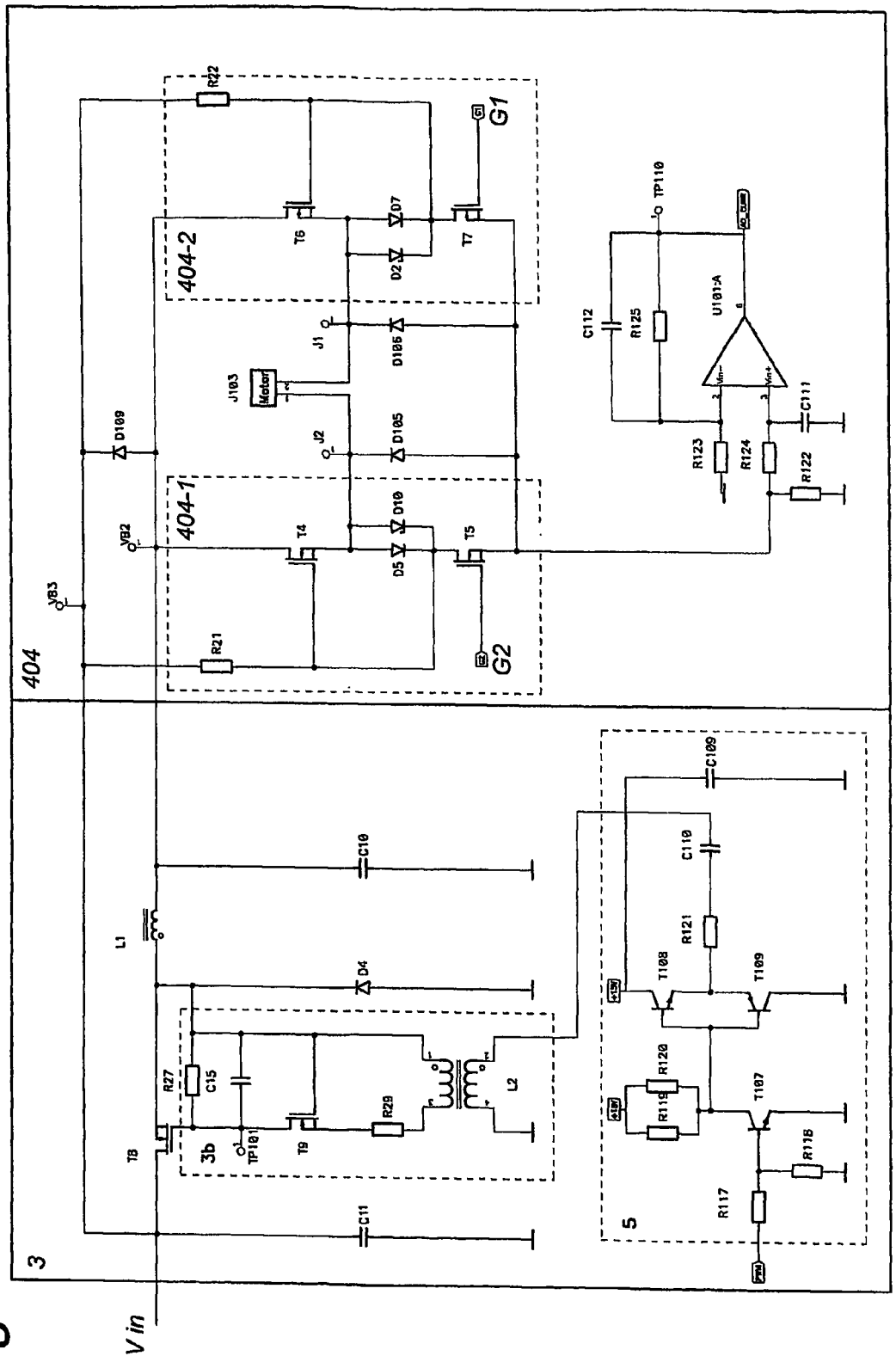
FIG. 11 shows a second preferred embodiment of a speed regulator according to the present invention.
Figure 12:
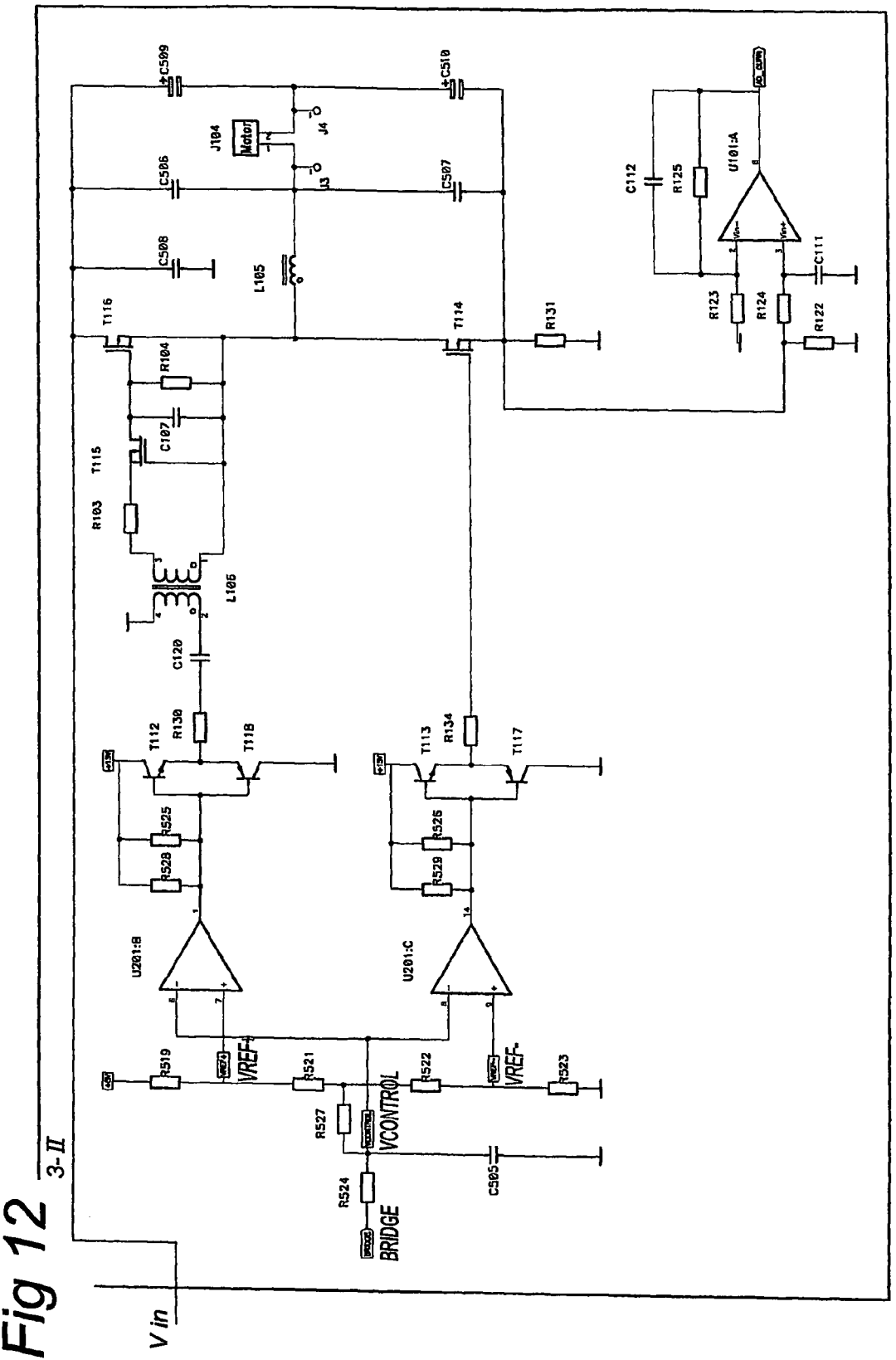
FIG. 12 shows a third preferred embodiment of a speed regulator according to the present invention.

Within the power supply 2-II there is a branch unit 2-IIb, which generates a further potential difference +15 V for the power supply to the low-voltage part of the circuit as shown in FIG. 11 and FIG. 12, respectively.

FIG. 11 shows a second preferred embodiment of a speed regulator according to the present invention.

The component circuit comprises the Buck regulator 3 and the H-bridge 404.

Supply voltage Vin is fed to the Buck regulator 3 from the power supply 2-II. Alternating voltage (for example 230V) is input at junctions J3 and J4, after which the power supply 2, after rectification, makes a rectified voltage (for example 300V) available on line VB1.

The Buck regulator 3 is made up of transistor T8, coil L1, diode D4 and capacitor C10. Transistor T8 is a MOSFET with a drain connected to VB1 and with a source at an input of L1 and an input of D4. An output of diode D4 is also connected to ground GND. An output of coil L1 is connected to an input of C10, an output of C10 being connected to ground. VB1 is likewise connected to ground via capacitor C11.

The gate of MOSFET T8 is controlled by a pulse transformer circuit 3b.

Pulse transformer circuit 3b comprises a pulse transformer L2, a resistor R29, a MOSFET transistor T9, a capacitor C15 and a second resistor R27.

On its input side, a first input L2-4 of pulse transformer L2 is connected to ground; a second input L2-2 of the pulse transformer L2 is connected to the drive regulator 5 that generates drive pulses for the pulse transformer circuit 3b.

On its output side L2-3, pulse transformer L2 is connected via resistor R29 to a source of MOSFET transistor T9. Via second output L2-1, pulse transformer L2 is connected to a gate of MOSFET T9 and also to an input of capacitor C15 and an input of resistor R27 as well as to the line between L1 and D4.

The output of C15 is connected to the source of T8. The output of resistor R27 is likewise connected to the source of T8.

The Buck regulator 3 regulates the drive voltage $V(\phi)$ for the motor 1, via H-bridge 4, by means of pulse width modulation (PWM. H-bridge 4 will be described in more detail later.

Because the drain of T8 is directly on the rectified voltage VB1, the pulse transformer circuit 3b is used to drive the gate of T8. With this arrangement it is necessary to be able to vary the duty cycle of T8 within a broad range. If the pulse transformer were to be coupled directly to T8, this is not possible. In order to achieve a wide variation in duty cycle, use is made of a control MOSFET T9, in accordance with the following principle: the pulse transformer L2 is a type with relatively low self-induction, as a result of which the pulse transformer L2 is able to generate narrow pulses (approximately 2 μs wide) as output signal. A positive pulse renders T8 conducting; a subsequent negative pulse puts T8 into the off state. A positive pulse loads the gate of T8 via the intrinsic flywheel diode of T9. Once the gate of T8 has been charged, this is no longer discharged because T9 will turn off when the output voltage of L2 falls to zero. In the case of a negative pulse T9 starts to conduct again and the gate of T8 is discharged, as a result of which T8 reaches the off state. T8 thus functions as a switch for the voltage on VB1 to the H-bridge 4. Resistor R27, which is connected in parallel with T8, ensures that T8 does not start conducting if the control of the pulse transformer circuit 3b is not active. The gate-source capacity of T8 is increased by the connection of C15 in parallel across the source of T8 and the input of L1. On the one hand, C15 lowers the dissipation in T8, by the increase in the gate voltage. On the other hand, the switching time of T8 becomes longer because the discharge of C15 delays switching. The value of C15 has been chosen as a compromise. Resistor R29 serves to restrict the maximum gate current of T8 and to damp resonance in the pulse transformer circuit 3b.

The H-bridge circuit 404 comprises MOSFETs T4, T5, T6, T7, diodes D5, D7, D105, D106, D109, Zener diodes D2, D6 and resistors R21, R22.

Within the H-bridge 404, the brushless DC motor 1 is connected to junctions J1 and J2. The H-bridge 404 is connected to the Buck regulator 3 via line VB2 and line VB3. The H-bridge 404 has two branches, a first branch 404-1 and a second branch 4-2, both of which are connected to ground on one side A. The first branch 404-1 comprises MOSFETs T4, T5, diode D5, Zener diodes D6, D10, measurement resistor 122 and resistor R21.

The second branch 404-2 comprises MOSFETs T6, T7, diode D7, Zener diode D2 and resistor R22.

Because of the symmetrical construction, only branch 404-1 is described. If the voltage at G2 is sufficiently high, for example 12 V, T5 will conduct. Diode D5 will start conducting. Junction J2 is then connected to ground. The gate of T4 has a somewhat lower voltage (approximately 0.6 V) than the source voltage of D5 (i.e. $V_F$ of D5), so that T4 is in the off state.

If the voltage on G2 is essentially zero volt, T5 will be in the off state. The voltage on the gate of transistor T4 will rise and T4 will start conducting. The voltage on the source of T4 rises until the source-drain voltage $V_{DS}$ is virtually 0 volt. Diode D5 now turns off, Zener diode D10 ensuring that the source-gate voltage $V_{GS}$ of T4 is limited to 12 volt.

The supply voltage from the Buck regulator 3 will now be on J2. Because the phase detector circuit varies the voltage on G1 and the voltage on G2 in opposing phases with one another, an alternating voltage is produced across the junctions J1 and J2, the alternating frequency of which corresponds to the frequency of rotation of the motor.

In the first branch 404-1 of H-bridge 404, Zener diode D6 has its input to ground and its output is connected to the gate of transistor T5. The connection point G2 is also at the gate of T5. The drain of transistor T5 is also to ground.

A first lead of resistor 21 is connected to line VB3 and its second lead is connected to the gate of transistor T4 and to the outputs of diode D5 and Zener diode D10. The outputs of D5 and D10 are likewise connected to the source input of transistor T5.

Line VB2 is connected to the drain of transistor T4. The gate of transistor T4 is connected to the input of diode D5 and the input of Zener diode D10. The source of transistor T4 is connected to junction J2.

In branch 404-2 of H-bridge 404, the source of transistor T6 is connected to line VB2. A first lead of resistor R22 is connected to line VB3. The second lead of R22 is connected to the gate of transistor T6 and to the drain of transistor T7. The source of transistor T6 is connected to an input of diode D7 and to the Zener diode D2 connected in parallel with the latter. The outputs of diode D7 and Zener diode D2 are connected to the drain of transistor T7. The gate of transistor T7 is connected to the connection point G1. The source of transistor T7 is connected to ground.

The circuits in FIGS. 6, 7, 8 and 9 and in FIGS. 10 and 11 that have been described above have the advantage over a circuit from the state of the art that instead of a complete H-bridge that operates at 20 kHz (or thereabouts), only one transistor (for example a MOSFET) has to be driven at high frequency.

Furthermore, the coupling of the pulse width modulation signal, which is generated by a microcomputer, microcontroller or other regulating element is coupled via a pulse transformer to the high frequency MOSFET.

By virtue of the pulse transformer it is possible to couple the pulse width modulation signal, that has a low voltage of 5 to 12 volt, to the high frequency MOSFET that operates at 300 volt. Advantageously, expensive optical or capacitive insulation is not needed for this purpose.

Furthermore, it is pointed out that in the case of an H-bridge that operates entirely at high frequency, only a duty cycle with a symmetrical loading of the MOSFET can be achieved, as will be known to a person skilled in the art. An asymmetrical duty cycle is not possible. However, the circuit according to the present invention is able to transmit an arbitrary duty cycle, with the aid of the pulse width modulation. As already described with reference to FIG. 6, a first pulse renders a transistor T8 conducting, whilst a following negative pulse puts T8 into the off state. As a result it is possible to provide the output voltage $V(\phi)$ with an arbitrary duty cycle.

FIG. 12 shows a third preferred embodiment of a component circuit for a speed regulator according to the present invention.

The part of the circuit contains a Buck regulator integrated in a half H-bridge 3-II.

The supply voltage Vin for circuit 3-II is taken from power supply 2-II. This power supply can be identical to the power supply as described with reference to FIG. 10.

The mode of operation of the Buck regulator, integrated with the half H-bridge, is described below.

The motor is connected to the junctions J3 and J4. The H-bridge is provided with a supply voltage VB1 of, for example 300V. During normal operation of the circuit there will be a direct voltage on the junction J4 of the motor, which voltage is half the supply voltage VB1. By correct driving of the H-bridge, the voltage on junction J4 can vary between 0 V and VB1 (300 V). On balance, the voltage across the motor junctions (J3-J4) can thus vary between −½VB1 and +½VB1.

The voltage on J3 is determined by the switching torques of the two MOSFETs T114 and T116. The coil L105 and the capacitors C506 and C507 together form a low-pass filter. This filter ensures that the switching pulses of the H-bridge do not reach the connections of the motor.

The control of the MOSFET T114 is implemented with the resistors R529, R526, R134, transistors T113 and T117 and comparator U201:C. If the voltage on pin 9 of U210:C (VREF−) is higher than the voltage on pin 8 of U210:C (VCONTROL), there will be a voltage of approximately 15 volt on the gate of T114. The result of this is that T114 is conducting. If the voltage on pin 9 of U210:C (VREF−) is lower than the voltage on pin 8 of U210:C (VCONTROL), there will be a voltage of approximately 0 volt on the gate of T114. The consequence of this is that T114 is non-conducting.

The control of the MOSFET T116 is implemented with the resistors R528, R525, R130, R103, R104, transistors T112 and T118, capacitors C120 and C107, coil L106 and comparator U201:B. If the voltage on pin 7 of U210:B (VREF+) is lower than the voltage on pin 6 of U210:B (VCONTROL), there will be a voltage of approximately 15 volt on the gate of T116. The consequence of this is that T116 is conducting.

If the voltage on pin 7 of U210:B (VREF+) is higher than the voltage on pin 6 of U210:B (VCONTROL), there will be a voltage of approximately 0 volt on the gate of T116. The consequence of this is that T116 is non-conducting.

If T116 and T114 are conducting at the same time, a situation arises where short-circuiting takes place between the supply voltage VB1 and the GND. The circuit is set up in such a way that this situation cannot arise. The correct drive for the comparators U201:B and U201:C is achieved with the aid of the network of resistors R519, R521, R522, R523, R524, R527 and capacitor C505.

If VCONTROL>VREF+, T116 will be conducting and T114 non-conducting.

If VREF+>VCONTROL>VREF−, both T116 and T114 will be non-conducting.

If VCONTROL<VREF−, T116 will be non-conducting and T114 conducting.

Between T114 being conducting and T116 being conducting there is always a situation in which both T116 and T114 are non-conducting. Those skilled in the art know this is as 'dead time'.

The duration of the 'dead time' is influenced by the rise time of VCONTROL. In the circuit this rise time is determined by R24 and C5. In the circuit shown the H-bridge is controlled by means of a control signal supplied to the 'BRIDGE' input.

The circuit described is implemented such that if the BRIDGE input has high-ohm termination, the condition that VREF+>VCONTROL>VREF−
and that both T116 and T114 will be non-conducting is met.

In use, the BRIDGE input is provided with a pulse width modulation signal as control signal. This pulse width modulation signal is, for example, generated with the aid of the component circuit as shown in FIG. 7, the DAC signal described there being converted into a pulse width modulation signal. It will be clear to a person skilled in the art that the pulse width modulation system can also be generated in another way.

Other alternatives and equivalent embodiments of the present invention are conceivable within the inventive concept, as will be clear to a person skilled in the art.

The invention claimed is:

1. Speed regulator for a brushless DC motor, wherein the DC motor comprises a stator, a rotor and an electromagnet wherein the electromagnet is in the vicinity of the stator, the rotor produces a permanent magnetic field and the electromagnet is activated to generate an alternating magnetic field;
furthermore comprising a power supply and a regulating element, the regulating element being connected to the power supply to regulate the power feed to the electromagnet, so that, during use, a torque generated by the DC motor is regulated, wherein
the speed regulator is able to generate a voltage (V(φ)) as a function of rotor speed of revolution, rotor position (φ), rotor load and motor activation,
wherein the speed regulator sets the change in the voltage V((φ)) of the motor as a function of the rotor position cp in such a way that the instantaneous torque T((φ)), at least in the vicinity of the reversal in polarity of the driving magnetic field, complies with the conditions that
the derivative σT(φ)/σφ is essentially zero and
the second derivative σT²((φ))/σφ² is an essentially monotonic function.

2. Speed regulator for a brushless DC motor according to claim 1, wherein the instantaneous torque τ(φ), at least in the vicinity of a reversal in polarity of the driving magnetic field, essentially complies with $$T(\varphi) = \hat{T}\left(\frac{1}{2} - \frac{1}{2}\cos(4\varphi)\right)$$

where $\hat{T}$ is an average value of the torque.

3. Speed regulation for a brushless DC motor according to claim 1, wherein the instantaneous torque T(φ), at least in the vicinity of a reversal in polarity of the driving magnetic field, essentially complies with $$T(\varphi) = \hat{T} \cdot \left(\frac{1}{2} - \frac{1}{2}\cos(2n\varphi)\right)$$

where $\hat{T}$ is an average value of the torque and n is the number of pole pairs of the stator.

4. Speed regulator for a brushless DC motor according to claim 1 wherein the regulating element (9) sets the change in the voltage V(φ) of the motor as a function of the rotor position φ.

5. Speed regulator for a brushless DC motor according to claim 1 wherein
the regulator also comprises a Buck regulator (3; 3-II), an H-bridge (4; 404; 3-II) and a drive regulator (5),
wherein the Buck regulator (3; 3-II) serves to generate the drive voltage |V(φ)|, the Buck regulator (3; 3-II) is connected via its input to an output of the drive regulator (5) for receiving an activation signal and via its output to an input of the H-bridge (4; 404; 3-II) for transmitting the drive voltage V(φ)
wherein the drive regulator (5) generates a high frequency low-voltage pulse width modulation signal (T+) as the activation signal.

6. Speed regulator for a brushless DC motor according to claim 5, wherein the Buck regulator (3) comprises a regulating transistor (T8) for regulating the voltage (V(φ), a drive transistor (T9) for driving the regulating transistor (T8) and a pulse transformer (L2);
wherein the pulse transformer (L2) converts the high frequency low-voltage pulse width modulation signal (T+) into a high frequency activation signal for drive transistor (T9), and
wherein the activation signal is fed from the drive transistor (T9) to the gate of the regulating transistor (T8) so as to switch the regulating transistor (T8).

7. Speed regulator for a brushless DC motor according to claim 1, wherein the H-bridge (4; 404) comprises a first drive branch (4-1; 404-1) for driving the DC motor (1) via a first junction (J1) and a second drive branch (4-2; 404-2) for driving the DC motor (1) via a second junction (J2),
wherein the first drive branch (4-1; 404-1) comprises first and second drive transistors T4, T5) and the second drive branch (4-2; 404-2) comprises third and fourth drive transistors (T6, T7),
and wherein the first drive branch (4-1; 404-1) is provided with a first input (G2) and the second drive branch (4-2; 404-2) is provided with a second input (G1) for receiving a phase detection signal that has been derived from a rotor speed of revolution, rotor position (φ) and rotor load.

8. Speed regulator for a brushless DC motor according to claim 1, wherein the regulator also contains a Hall sensor (6) and a regulating element (9),
wherein:
the Hall sensor (6) is equipped to pick up a signal from the rotor position (φ) and the output of the Hall sensor (6) is connected to an input of the regulating element (9);
the regulating element (9) is provided with a voltage source (32) that can be regulated, one output of which is connected to an input of the drive regulator (5), for feeding back information from the signal picked up by the Hall sensor (6) to the drive regulator (5).

9. Speed regulator for a brushless DC motor according to claim 1, wherein the regulator also contains a current feedback unit (7), wherein:
the current feedback unit (7) is equipped to pick up a current signal from the current supplied to the DC motor (1; motor) by the H-bridge (4; 404; 3-II), and the output of the current feedback unit (7) is connected to an input of the regulating element (9);
the regulating element (9) feeds back information from the current signal from current feedback unit (7) to the drive regulator (5) via the voltage source (32) that can be regulated.

10. Speed regulator for a brushless DC motor according to claim 1, wherein the regulator also contains voltage feedback unit (8); wherein:
the voltage feedback unit (8) is equipped to pick up a voltage signal from the drive voltage I V((p) I generated by the Buck unit (3; 3-II) and the output of the voltage feedback unit (8) is connected to an input of the regulating element (9);
the regulating element (9) feeds back information from the voltage signal from voltage feedback unit (8) to the drive regulator (5) via the voltage source (32) that can be regulated.

* * * * *